UNITED STATES PATENT OFFICE.

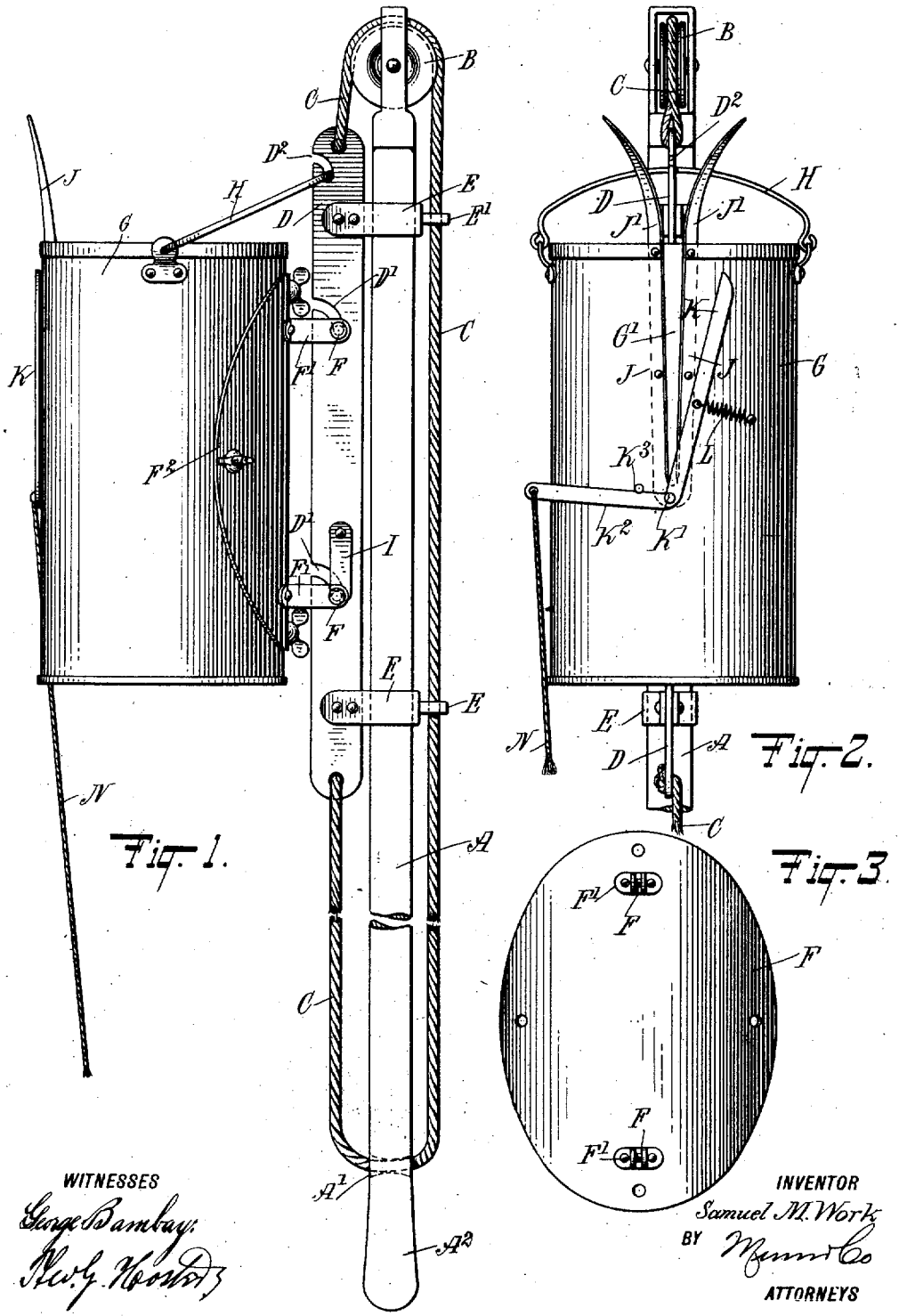

SAMUEL M. WORK, OF INDIANA, PENNSYLVANIA.

FRUIT-PICKER.

1,018,287. Specification of Letters Patent. Patented Feb. 20, 1912.

Application filed October 4, 1911. Serial No. 652,758.

*To all whom it may concern:*

Be it known that I, SAMUEL M. WORK, a citizen of the United States, and a resident of Indiana, in the county of Indiana and State of Pennsylvania, have invented a new and Improved Fruit-Picker, of which the following is a full, clear, and exact description.

The object of the invention is to provide a new and improved fruit picker, which is simple and durable in construction, easily manipulated and arranged to permit of readily picking apples, pears and other fruits without danger of bruising the same, to allow lowering of the picked fruit without requiring the operator to lower the pole, and to permit of readily reaching the fruit at different heights without changing the position of the pole. For the purpose mentioned, use is made of a fruit-receiving receptacle mounted to slide up and down on a pole.

A practical embodiment of the invention is represented in the accompanying drawings forming a part of this specification, in which similar characters of reference indicate corresponding parts in all the views.

Figure 1 is a side elevation of the fruit picker; Fig. 2 is a front elevation of the same; and Fig. 3 is a face view of the attaching plate for the fruit-receiving receptacle.

On the upper end of a pole A of suitable length or height is mounted a pulley B, over which passes a rope C connected at its ends to the upper and lower ends of a slide D provided with bearings E engaging the pole A so as to permit of moving the slide D up or down on manipulating the rope C correspondingly. The rope C passes at the bottom through a guide opening $A'$ formed in the handle portion $A^2$ of the pole A. The slide D is provided with spaced curved notches $D'$ adapted to be engaged by lugs F held on brackets $F'$ fastened to an attaching plate $F^2$, riveted, bolted or otherwise secured to the back of a fruit-receiving receptacle G adapted to move up and down with the slide D when the operator manipulates the rope C correspondingly, that is, pulling down on the outer strand of the rope C causes an upward movement of the slide D and the fruit-receiving receptacle G, and a downward pull on the other strand causes a downward movement of the said slide D and the fruit-receiving receptacle G. The fruit-receiving receptacle G is provided at its upper end with a bail H adapted to engage a curved notch $D^2$, and by the arrangement described the fruit-receiving receptacle G can be readily placed in position on the slide D or removed therefrom whenever it is desired to empty the fruit-receiving receptacle G of the picked fruit. Normally, the fruit receiving receptacle G is locked in position on the slide D by a gravity locking plate I pivoted on the slide D and engaging the top of one of the lugs F so as to normally hold the latter in position in the bottom of the corresponding notch $D'$.

The front of the fruit-receiving receptacle G is provided with a slot $G'$ for the reception or passage of the stem of the fruit to be picked, and the said slot $G'$ extends from the upper edge of the receptacle G in a downward direction and to within a suitable distance from the bottom of the receptacle. The slot $G'$ gradually enlarges toward the upper receptacle edge so as to permit ready entrance of the stem of the fruit, and along the said side walls of said slot extend reinforcing plates J terminating at their upper ends in prongs $J'$ curved outwardly in opposite directions to readily guide the stem of the fruit into the slot $G'$. By the arrangement described, the operator on moving the receptacle G upward after the pole is erected, can readily engage the prongs $J'$ with the stem of the fruit to be picked so that the fruit passes into the receptacle G while the stem passes into the slot $G'$ and is cut off or broken off from the branch, it being understood that the side edges of the slot $G'$ are sufficiently sharp to detach the fruit from the branch or cut the stem during the upward movement of the receptacle G. For very tough stems it is necessary to use a knife K, which is for this purpose pivoted at $K'$ on the front of the receptacle G immediately below the lower end of the slot $G'$, so that the knife K can swing across the slot $G'$ throughout the entire length to cut off the same. The knife K is normally held in open position by the action of a spring L, and the fulcrum end of the knife is provided with an arm $K^2$ connected with one end of a rope N extending downward to the ground to be under the control of the operator. Thus when it is desired to cut a stem with the knife K it is only necessary for the operator to exert a downward pull on the rope N to impart a swinging motion to the knife K to cut off the stem. When the operator releases the rope N then the knife K swings back to normal position by the action of its spring L, and the return movement of the knife K is limited by a stop pin K³ held on the receptacle G and engaged by the operating arm K². The downward-extending strand of the rope C is preferably guided in eyes E' held on the bearings E of the slide or carrier D.
It is understood that in using the fruit picker the pole A is placed in a vertical position, and then the operator on pulling on the down strand of the rope C causes the slide D and the receptacle G to move upward, so that the fruit passes into the upper open end of the receptacle G with the stem of the fruit between the prongs J'. When the stem is caught between the sides of the slot G' and a further upward movement is given to the receptacle G then the stem is pulled off its branch, or the stem is cut, as the case may be, the fruit, however, being retained in the receptacle G. If necessary, use may be made of the knife K for cutting off the stem, as above explained.

It is understood that the above-described operation can be repeated a number of times, to fill the receptacle G with fruit, and when the receptacle is filled the operator pulls on the downward run of the rope C so as to cause the slide D with the receptacle G to slide downward to within reach of the operator, so that the latter can detach the receptacle G from the slide D and empty the receptacle of its contents. The empty receptacle is then replaced on the slide D, and the latter, with the receptacle is again raised on the pole A by the operator manipulating the upward run of the rope C.

In practice, the pole A is preferably made polygonal in cross section, and the bearing E is shaped correspondingly so that the slide D and the receptacle G are held against turning around on the pole A.

From the foregoing it will be seen that the fruit can be readily picked at different heights without changing the position of the pole, and the fruit can be lowered to the ground and the receptacle emptied of its contents and replaced and raised for gathering more fruit without lowering the pole.

Having thus described my invention, I claim as new and desire to secure by Letters Patent:

1. A fruit picker, comprising a pole, a slide mounted for movement up and down on the said pole, and provided with notches, means for imparting an up and down movement to said slide, a fruit receiving receptacle provided with lugs for detachable engagement with the said notches, and a gravity latch member pivoted on said slide for engagement with one of said receptacle lugs, in order to removably secure the receptacle in engagement with the slide.

2. A fruit picker, comprising a pole, a fruit receiving receptacle mounted to slide up and down on the pole, and provided with a slot extending from the upper edge of the receptacle in a downward direction, the slot gradually enlarging toward said receptacle edge, prongs attached to the said receptacle at the side walls of the said slot, the upper ends of the prongs being curved outwardly and away from each other and extending a distance beyond the upper edge of the receptacle, and manually-controlled means for imparting an up and down sliding movement to the said receptacle.

3. A fruit picker, comprising a pole, a fruit receiving receptacle provided with a slot extending from the upper edge of the receptacle in a downward direction, a slide carrying the said receptacle, a manually-controlled knife comprising a single blade on the said receptacle and operating in conjunction with the said slot for cutting off the stem of the fruit, and manually-controlled means for imparting an up and down sliding movement to the said slide and the receptacle carried thereby.

4. A fruit picker, comprising a pole provided at its upper end with a pulley, a rope passing over the said pulley, a slide mounted to slide up and down on the said pole and having its ends connected with the said rope, and a fruit-receiving receptacle detachably held on the said slide and provided with a slot extending from the upper edge of the receptacle downward, the slot gradually enlarging toward said receptacle edge, and prongs attached to the said receptacle at the side walls of the said slot, the upper ends of the prongs being curved outwardly and away from each other and extending upward a distance beyond the upper edge of the receptacle.

5. A fruit picker, comprising a pole provided at its upper end with a pulley, a rope passing over said pulley, a slide mounted to slide up and down on the said pole and having its ends connected with the said rope, a fruit receiving receptacle detachably held on the said slide and provided with a slot extending from the upper edge of the receptacle downward, the slot gradually enlarging toward said receptacle edge, prongs attached to the said receptacle at the side walls of the said slot, the upper ends of the prongs being divergently curved and extending a distance beyond the upper edge of the receptacle, a spring-pressed knife fulcrumed on the receptacle below the lower end of the said slot, and adapted to swing across the slot, an arm on the said knife, and an operating rope connected with the said knife arm.

6. A fruit picker, comprising a pole provided at its upper end with a pulley, a rope passing over the said pulley, a slide mounted to slide up and down on the said pole and having its ends connected with the said rope, the said slide having notches, and a fruit receiving receptacle provided with lugs for engagement with the said notches whereby the receptacle may be quickly detached from the slide.

7. A fruit picker, comprising a pole provided at its upper edge with a pulley, a rope passing over the said pulley, a slide mounted to slide up and down on the said pole and having its ends connected with the said rope, the said slide having notches, a fruit receiving receptacle provided with lugs for engagement with the said notches, and pivoted locking means for locking the receptacle in place on the slide.

In testimony whereof I have signed my name to this specification in the presence of two subscribing witnesses.

SAMUEL M. WORK.

Witnesses:
J. T. STEWART,
HENRY PROTHERO.